W. WESTBURY.
PROCESS FOR DRAWING GLASS CYLINDERS.
APPLICATION FILED OCT. 3, 1917.
1,307,946.
Patented June 24, 1919.
2 SHEETS—SHEET 1.
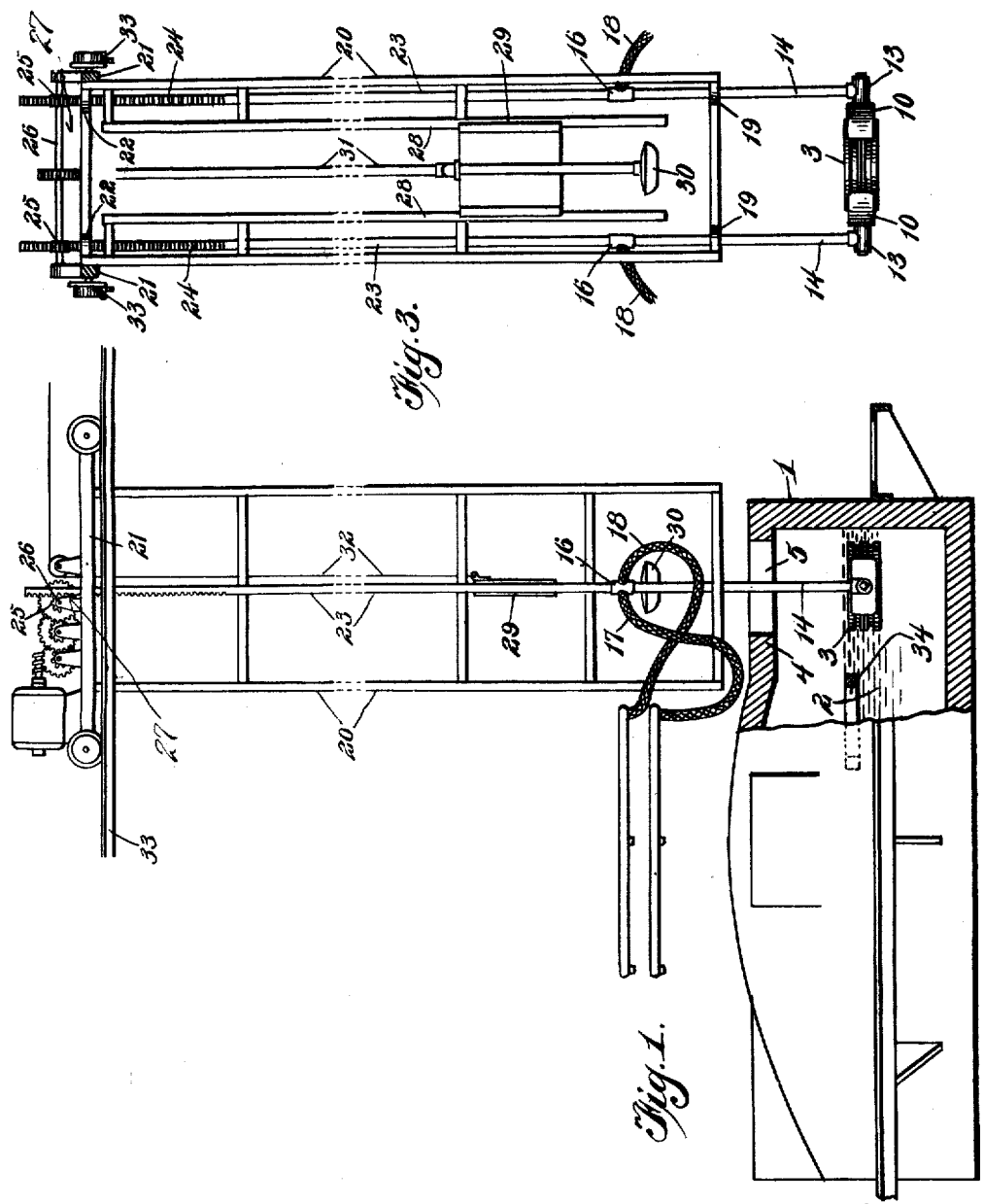
Inventor
William Westbury
By C. C. Hines,
Attorney

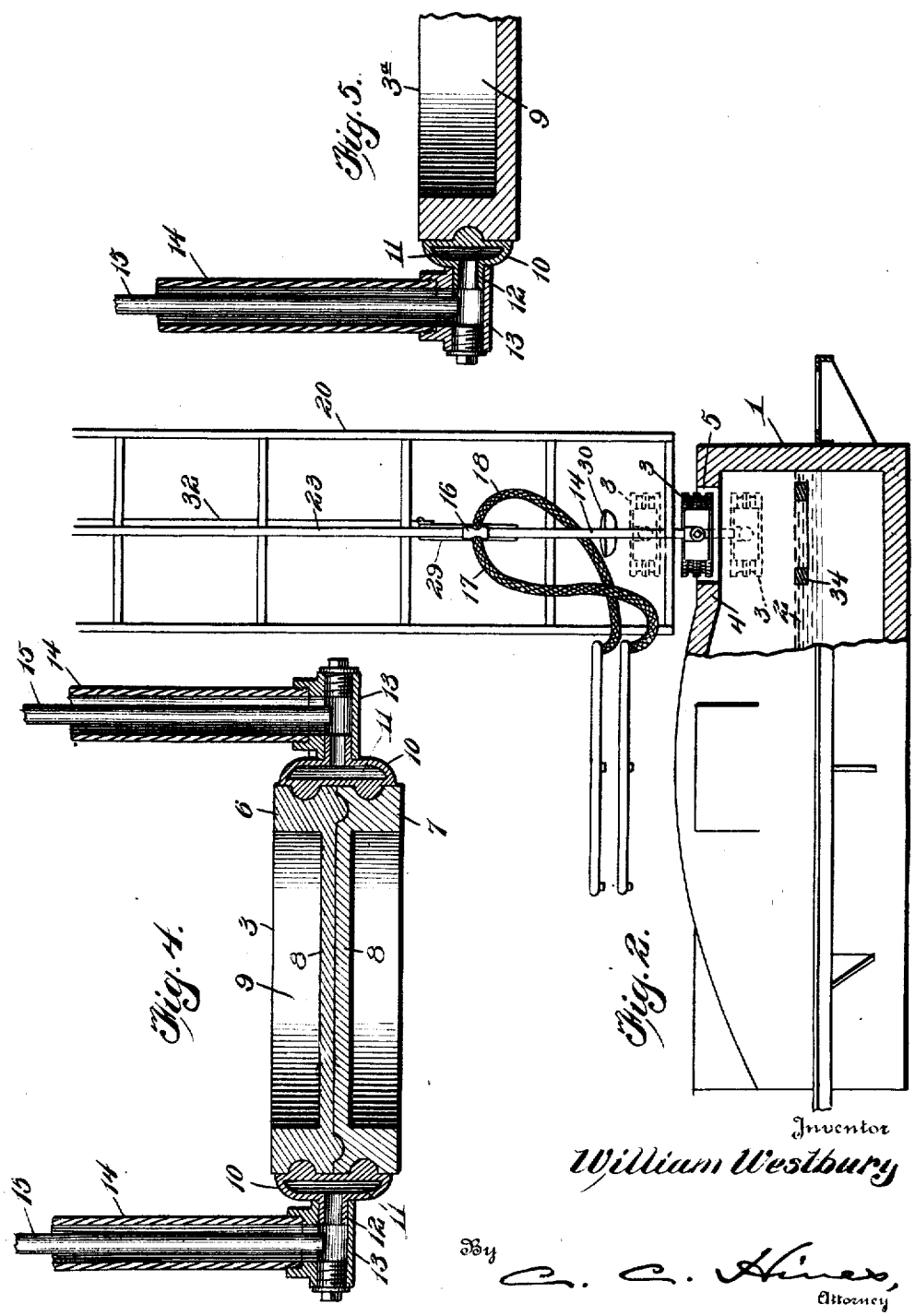

UNITED STATES PATENT OFFICE.

WILLIAM WESTBURY, OF OKMULGEE, OKLAHOMA.

PROCESS FOR DRAWING GLASS CYLINDERS.

1,307,946.　　　　　Specification of Letters Patent.　　Patented June 24, 1919.

Application filed October 3, 1917. Serial No. 194,497.

*To all whom it may concern:*

Be it known that I, WILLIAM WESTBURY, a citizen of the United States, residing at Okmulgee, in the county of Okmulgee and State of Oklahoma, have invented new and useful Improvements in Processes of Drawing Glass Cylinders, of which the following is a specification.

This invention relates to a process of drawing glass cylinders for use in the production of window glass, etc., whereby greater rapidity of action, economy of manufacture, uniformity of operation in the proportion of perfect draws made and other substantial advantages are gained over the methods customarily employed.

Heretofore, two specifically different methods of drawing glass cylinders have been generally used. One of these, which may be termed the direct-draw or open-bottom-pot method, involves the direct drawing of the cylinder from a body of molten glass within a glass melting furnace through what is known as a drawing opening in the top stone of the furnace body or a so-called doghouse communicating with the furnace body. The objection to this method is two-fold. In the first place, the body of glass disposed directly beneath the drawing opening is more or less exposed to the chilling effects of the atmosphere, resulting in its surface reduction of temperature and the formation of crusts mixing with the pure liquefied glass, interfering with the drawing action and adding to the cost of fuel required to keep the body of glass at the required temperature. In the second place, as the portion of glass from which the cylinder is drawn is exposed to the heat of the mass or body of glass within the furnace, the glass cools very slowly to the degree required to form the cap and initial portion of the cylinder, thus reducing the speed of the drawing action to a considerable extent. In an attempt to overcome these objections various devices have been employed to shield the body of glass from atmospheric chilling, and floating rings or pots more or less open at the bottom have been used for the purpose of segregating a charge of pure hot glass from the body of surface-chilled glass within the portion of the furnace beneath the drawing opening. The use of such a pot or ring is of advantage from the standpoint of segregating a portion of the glass from the impurities and denatured glass upon the body of glass within the drawing zone and of enabling the direct return of the aftermath for remelting back into the body of glass without rehandling, but still leaves the operation open to the objection of the segregated portion of glass being exposed to the heat of the main body of glass and cooling too slowly for a quick draw. Modifications of this method have been suggested, having for their object the shielding of the segregated charge of glass from the intense heat of the main body of glass, but none of these has been efficient in attaining the desired end.

In the other method referred to, and which may be termed the indirect-draw or closed-pot method, the glass is melted in one furnace and ladled into a closed-bottom pot supported and heated by a separate furnace. This requires the use of two separate plants with additional labor and handling of parts and the rehandling and return of the aftermath by manual labor or mechanical means to the melting furnace. This indirect method has one advantage over the direct method first named, in that the glass is exposed directly to open-air cooling and is insulated largely by the bottom of the pot from the heat below, which is just sufficient to keep it properly liquefied, whereby the glass is permitted to rapidly cool below its initial temperature and to set quickly for a rapid cap formation and drawing action. One of these methods is, therefore, advantageous in having its working parts combined in a single apparatus, but open to the objection of slowness in starting the draw, while the other method is, on the other hand, objectionable in the use of separate furnaces, although allowing greater speed and a material saving of time in starting the draw.

The object of my invention is to provide a process whereby all the advantages of these methods may be gained and the disadvantages thereof obviated, and whereby a cylinder may be formed from a charge of glass taken from the melting furnace, drawn from a pot which closes or seals the drawing opening and in which the charge of glass is exposed to atmospheric cooling while protected from the heat of the furnace, and the residue or aftermath returned to the furnace in a ready and convenient manner, thus preventing undue chilling of the body of glass within the furnace, allowing rapid chilling of the glass within the pot, and enabling the operating of drawing glass cylinders to be carried on with less labor, time and expense.

In the accompanying drawing showing one form of apparatus which may be employed for carrying my process into practical effect:

Figure 1 is a vertical section through a part of a glass melting furnace, showing a drawing station and illustrating the pot in dipping position;

Fig. 2 is a similar view showing the pot in drawing position, and also showing two positions to which the pot may be adjusted for a reversing action;

Fig. 3 is a view in front elevation of the pot and the means for raising and lowering the same;

Fig. 4 is a sectional view through a double reversible pot which may be employed; and Fig. 5 is a similar view of a single reversible pot which may be employed.

In carrying my invention into practical effect, I provide a suitable type of apparatus including a glass melting furnace 1 containing a body of liquefied glass 2 from which charges of glass are supplied to the drawing pot 3 or 3ᵃ for successive drawing actions, the interior of the furnace being heated in any preferred manner. The furnace is provided with a top stone 4 formed with one or more drawing openings 5, a single drawing opening being shown in the present instance as sufficient to illustrate the invention. The pot 3 is shown in the form of a double reversible pot comprising superposed pot sections 6 and 7 having closed bottoms 8 arranged in abutting contact and glass receiving cavities or chambers 9 facing in opposite directions, the pot being reversible to alternately bring the chambers 9 into charge-receiving and draining positions. The pot may be made, as usual, of clay or other suitable refractory material.

The pot sections 6 and 7 are detachably connected by hollow clamping heads 10 having water chambers 11 for the circulation of water therethrough. The clamping heads are also provided with hollow spindles or trunnions 12 communicating with the water chambers and journaled in coupling bearings 13 upon the lower ends of pot supports. Each of these supports comprises a pair of upright concentric pipes or tubes 14 and 15, the outer pipes 14 forming discharge or waste pipes for the flow of the hot water from the chambers 11, while the pipes 15 serve as conductors for supplying cool water from a suitable source to said chambers. A circulation of water is thus provided for absorbing the heat from the pot to prolong the period of life thereof and to carry off the heat from the clamps to adapt them to sustain the high temperature to which they are subjected. The pot 3ᵃ is supported in the same manner as the pot 3 and consists of a single closed bottom pot, namely, a pot having a single chamber for the reception of the glass. In each form of pot the pot is thus reversibly mounted in the conducting bearings by the spindles or trunnions 12 of the heads 10, which spindles or trunnions 12 are rotatably mounted in the conducting bearings 13.

The pipes 14 and 15 are connected at their upper ends with couplings 16 with which are connected flexible pipes or tubes 17 and 18 for the respective discharge of the hot water from the pipes 14 to any desired point and the supply of cold water from any suitable source to the pipes 15. The pipes 14 are slidably mounted in suitable guides 19 upon a frame 20 depending from an overhead carriage 21, and this carriage is provided with guide sleeves 22 in which are slidably mounted rods 23 connected with the couplings 16. The rods 23 terminate at their upper ends in rack bars 24 engaging gears 25 on a shaft 26 forming part of a hoisting mechanism 27, whereby the pot and its supports may be raised and lowered with relation to the plane of the drawing opening.

Also mounted upon the frame 20 are guides 28 on which is slidably mounted the draw-carriage 29 supporting the drawing tool comprising the bait 30 and blow pipe or air supply pipe 31, which pipe may connect, in practice, in any suitable manner with a source of air supply to conduct air to the interior of the cylinder as it is being drawn. The carriage 29 is connected, in practice, by a cable 32 with any suitable type of hoisting gear (not shown) mounted upon the carriage 21 or within a pent house (not shown). The carriage 21 is mounted upon a track 33 which may extend between the furnace and the pent house, thus allowing the drawing mechanism in its entirety to be raised clear of the drawing station and transported to the pent house for convenience in repairing or replacing the pot or other damaged or worn out parts, or to move the drawn cylinder clear of the furnace for the take-down action.

Arranged within the furnace is a drain ring 34 composed of any suitable refractory material adapted to float upon the surface of the glass, and which may be pushed back and forth between the body of the furnace and the drawing station by means of a suitable tool.

In carrying the invention into practical effect for the drawing of a cylinder, the pot 3 is lowered until it is submerged in the body of glass 2 and the upper chamber or cavity 9 thereof is filled with a charge of glass. Through the mechanism above described the pot is then elevated until it fits within the drawing opening and the upper portion of the pot projects above the top of the top stone 4, whereupon the parts are in position for the operation of the drawing tool to draw the glass cylinder from the charge of glass in the pot in an obvious manner. By the described operation, the charge of glass for the draw is dipped by the pot directly from the body of glass 2 in the furnace, and the drawing opening 5 then substantially closed or sealed by the pot, whereby the body of glass 2 is insulated or protected by the pot from the chilling effects of the atmosphere during the drawing action. At the same time the pot insulates the charge of glass therein from the heat of the body of glass 2 in the furnace and exposes said charge beyond the zone of heat in the furnace to the direct cooling effects of the atmosphere. As a result the initial temperature of the charge of glass in the pot is no longer maintained by the heat of the furnace, but the charge is permitted to rapidly cool by direct exposure to the atmosphere. Hence the glass will more rapidly congeal about the bait and cool in the initial portion of the draw, allowing the cylinder to be drawn with much less trouble and with much greater speed than is possible in drawing the cylinder directly from the body of glass 2 or from a drawing ring or other receptacle in which the temperature of the charge of glass is influenced by the interior temperature of the furnace. Two substantial advantages are thus gained in the operation of drawing glass cylinders from a body of glass within a melting furnace: first, that of protecting the body of glass within the furnace from the chilling effects of the atmosphere, thus keeping the glass at a higher temperature and greater state of purity at the drawing station, while reducing the amount of fuel necessary to keep the body of glass at the proper temperature, and, secondly, that of isolating the charge of glass in the pot from the body of glass 2, so that the said charge will cool much more rapidly and allow the cylinder to be drawn with greater efficiency and rapidity.

After the cylinder is drawn and removed from the bait in the usual manner, the pot 3 may be raised to a position above the top wall 4 or be lowered to a position between the same and body of glass 2, as shown in dotted lines in Fig. 2, and then turned over or inverted, to bring the pot chamber which has been in use into lowermost position and to elevate the other pot chamber into position for use. The pot is then operated for the dipping action as previously described to fill the second named pot chamber and then raised to the drawing position for the drawing of the succeeding cylinder. By this means the pot chamber which has been previously used and which contains the residue or aftermath from the preceding charge is inverted and disposed above the body of glass 2, so that the residue or aftermath will be melted by the heat of the furnace and drained directly back into the furnace while the operation of drawing the glass cylinder from the glass in the upper pot chamber is being carried out. The drain ring 34 is preferably employed and provided to receive the melted aftermath draining from the bottom pot chamber, thus segregating the melted aftermath from the purified body of glass 2 in the drawing station, the ring being pushed back into the more intense heat of the body of the furnace before each dipping operation and drawn back into position for use before each draw and the melting of the aftermath from the preceding draw from the bottom chamber of the pot. Any suitable type of implement may be employed for this purpose.

In the use of the single pot 3ª instead of the double pot 3 the operation is the same as that previously described, except that the pot is inverted after each drawing action to allow the aftermath to melt and drain back into the furnace and is then restored to an upright position for the next dipping and drawing actions.

It will thus be seen that my invention provides a process whereby glass cylinders may be drawn from a pot filled directly with a charge of glass from the drawing chamber of the melting furnace, the temperature of the glass within the furnace protected during the drawing action, and the glass charge within the pot allowed to cool quickly for a rapid drawing action, thus obtaining all of the advantages, while eliminating the disadvantages, of the two methods of drawing glass cylinders hereinbefore referred to, and permitting such cylinders to be drawn with greater efficiency, rapidity and with greater economy over the methods heretofore in use.

I claim:

1. The process of drawing glass cylinders through the instrumentality of a glass melting furnace having a drawing opening, and a closed bottom pot tiltable upon a horizontal axis from a normal horizontal drawing position to an inverted draining position, and vice versa, which consists in lowering the pot in a direct vertical path and while in drawing position until submerged in the body of molten glass in the furnace, and so as to allow the glass to flow into the pot cavity, then raising the pot in a direct vertical path until it occupies the drawing opening, with its upper surface projecting slightly above the level of said opening, drawing the cylinder from the charge of glass in the pot, then moving the pot to a different horizontal level clear of the drawing opening, then tilting the pot to dispose the said pot chamber in an inverted position, and disposing the pot while in such position at a proper level to expose the aftermath in said pot chamber to the heat of the furnace for the melting of the aftermath and its drainage back into the furnace.

2. The process of drawing glass cylinders through the instrumentality of a glass melting furnace having a drawing opening, and a closed bottom pot tiltable upon a horizontal axis from a normal horizontal drawing position to an inverted draining position, and vice versa, which consists in lowering the pot in a direct vertical path and while in drawing position until submerged in the body of molten glass in the furnace, and so as to allow the glass to flow into the pot cavity, then raising the pot in a direct vertical path until it occupies the drawing opening, with its upper surface projecting slightly above the level of said opening, drawing the cylinder from the charge of glass in the pot, then moving the pot to a different horizontal level clear of the drawing opening, then tilting the pot to dispose the said pot chamber in an inverted position, disposing the pot while in such position at a proper level to expose the aftermath in said pot chamber to the heat of the furnace for the melting of the aftermath and its drainage back into the furnace, disposing a floating drain ring upon the surface of the charge of glass to receive the aftermath draining from the pot, moving said ring back into the furnace preliminary to each pot charging action, and drawing the ring back into receiving position preliminary to each draining action.

In testimony whereof I affix my signature.

WILLIAM WESTBURY.

Copies of this patent may be obtained for five cents each, by addressing the "Commissioner of Patents, Washington, D. C."